(No Model.) 2 Sheets—Sheet 1.
W. G. BELL.
MACHINE FOR CUTTING MEAT.
No. 287,360. Patented Oct. 23, 1883.
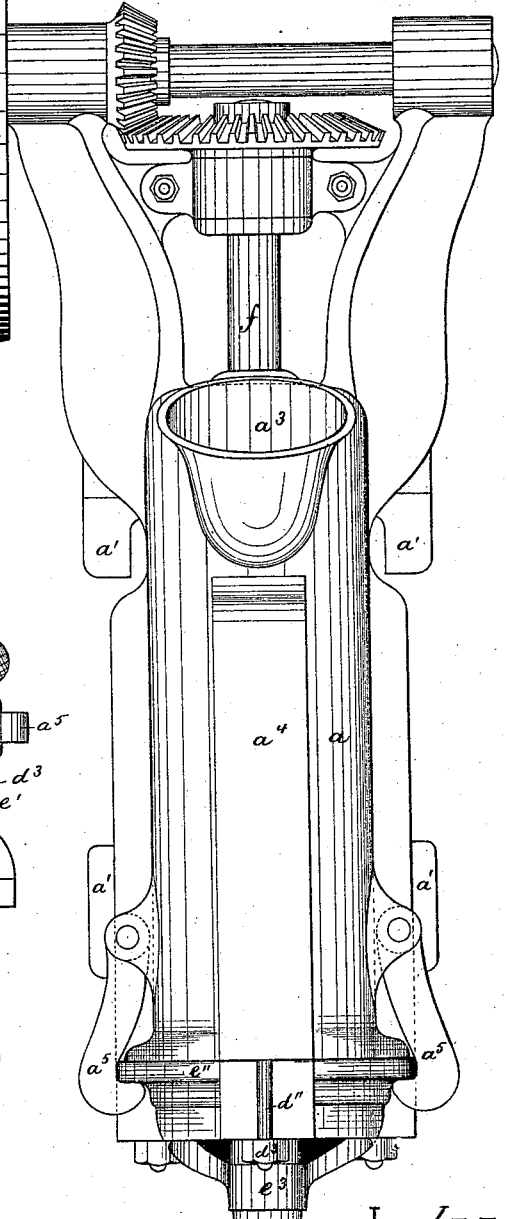
Fig. 1.
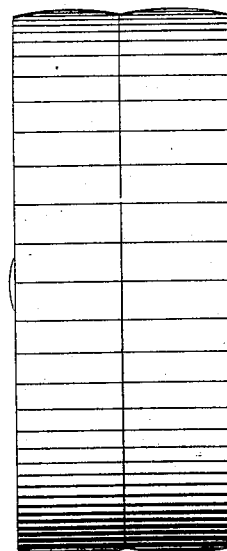
Fig. 4.
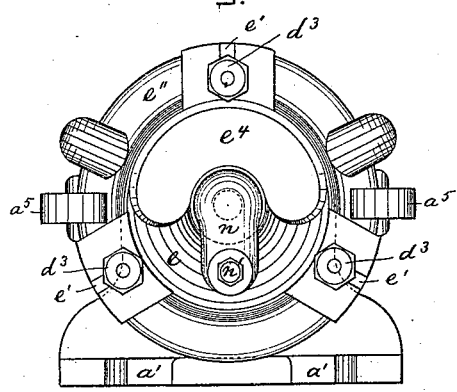
Fig. 5.
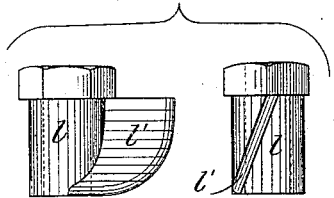
Witnesses.
Sarah M. Goodrich
John H. Foster
Inventor.
William G. Bell.
by Alban Andrew atty (No Model.) 2 Sheets—Sheet 2.
W. G. BELL.
MACHINE FOR CUTTING MEAT.
No. 287,360. Patented Oct. 23, 1883.
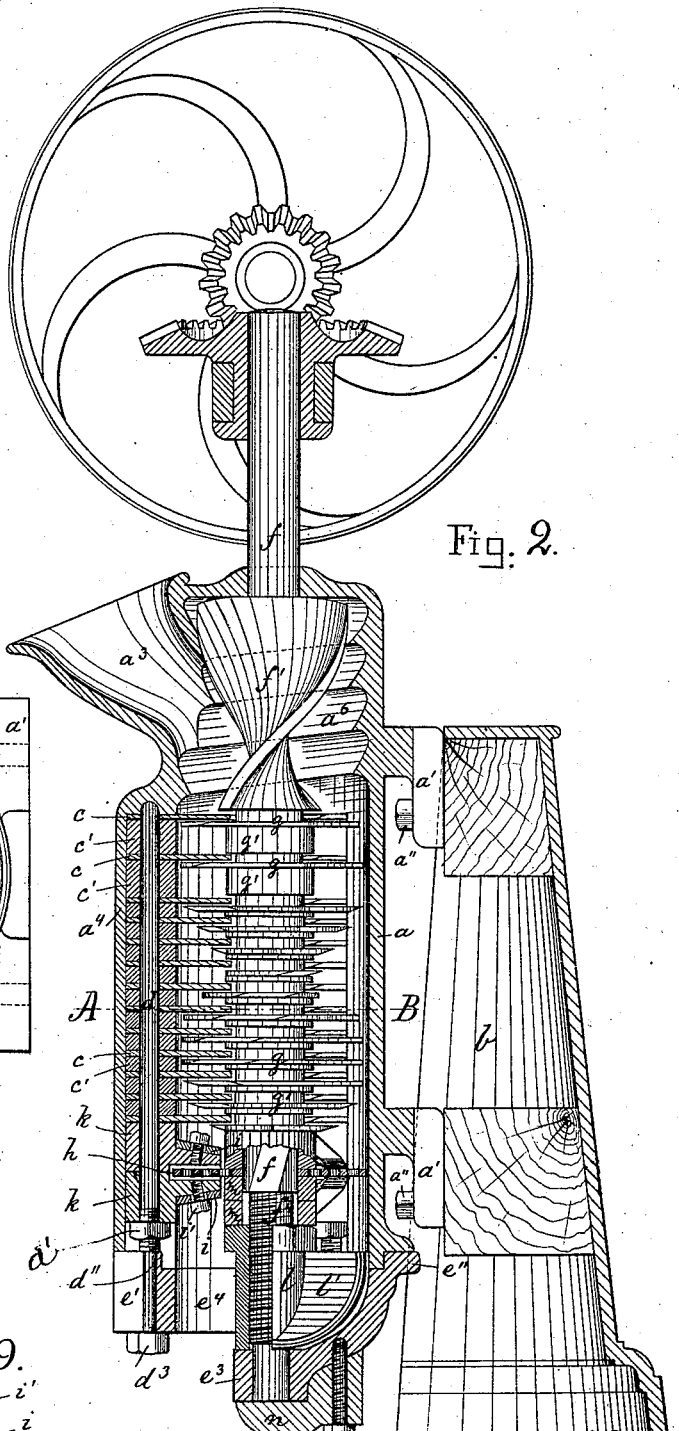
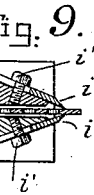
Witnesses.
Sarah M. Goodrich
John H. Foster
Inventor.
William G. Bell.
by Allan Andrew atts.

UNITED STATES PATENT OFFICE.

WILLIAM G. BELL, OF BOSTON, MASSACHUSETTS.

MACHINE FOR CUTTING MEAT.

SPECIFICATION forming part of Letters Patent No. 287,360, dated October 23, 1883.

Application filed April 12, 1883. (No model.)

*To all whom it may concern:*

Be it known that I, WILLIAM G. BELL, a citizen of the United States, residing at Boston, in the county of Suffolk and State of Massachusetts, have invented certain new and useful Improvements in Meat-Cutting Machines; and I do hereby declare that the same are fully described in the following specification and illustrated in the accompanying drawings.

This invention relates to improvements in meat-cutting machines for cutting sausage-meat, and it is carried out as follows, reference being had to the accompanying drawings, where—

Figure 1 represents a front elevation of my improved machine. Fig. 2 represents a central longitudinal section of it; and Fig. 3 represents a cross-section on the line A B, shown in Fig. 2. Fig. 4 represents a bottom view of the machine. Fig. 5 represents in front and side elevation the lower meat-expeller, shown detached from its vertical shaft. Fig. 6 represents in plan and section one of the stationary cutters. Fig. 7 represents in plan and section one of the rotary cutters, (shown as detached from the vertical shaft.) Fig. 8 represents a plan view of the rotary perforated diaphragm; and Fig. 9 represents a detail sectional view, showing the adjustable shearing-knives and means for securing them in positions above and below the perforated diaphragm.

Similar letters refer to similar parts wherever they occur on the different parts represented by the drawings.

This invention relates to improvements on the machine described in patent granted to me February 27, 1883, No. 273,200, and, like said patent, it has a vertical cylinder, $a$, provided with suitable ears, $a'\ a'$, by means of which and bolts $a''\ a''$ it is secured to the standard or frame $b$.

$a^3$ is the upper mouth or funnel, through which the meat that is to be cut is introduced into the cylinder $a$.

$a^4\ a^4\ a^4$ are the longitudinal recesses or pockets of cylinder $a$ for the reception of the cutters $c\ c$, each one of which is riveted to its division-block $c'$, as shown in Fig. 6. By making the cutters and dividing-blocks of one piece, or united together, less single pieces have to be manipulated in placing the cutters in the cylinder, and accuracy is obtained in getting the proper thickness of block and cutter, so as to pass properly between the rotary cutters.

Each series of cutters $c$ is located on a spindle, $d$, which projects through a perforation, $c''$, in each of said cutters $c\ c$, and has an upper bearing in the interior of the cylinder $a$, and a lower bearing and support in the radial slots $e'$ in the lower cover, $e$, which latter is secured to the lower end of cylinder $a$ by means of the hooks $a^5\ a^5$, as usual, and may be detached from said cylinder $a$ by swinging the hooks $a^5$ beyond the flange $e''$ on the cover $e$.

Within the upper end of the cylinder $a$ is a helical groove, $a^6$, which, in combination with the screw-propeller $f'$ on the cutter-shaft $f$, serves to feed the meat toward the cutters, as usual. The shaft $f$ is provided with suitable means for imparting to it a rotary motion, in a like manner as shown and described in my patent as aforesaid.

$g\ g\ g$ are the rotary cutters, secured to the central shaft, $f$, in a series below the screw-propeller $f'$, each of said cutters $g$ having riveted to it a division-block, $g'$, as shown in Fig. 7, and each cutter $g$, with its division-block $g'$, is provided with an oblong perforation, $g''$, adapted to fit the spirally-flattened sides of the cutter-shaft, as usual in meat-cutting machines.

Below the lowest rotary cutter $g$ is secured on the cutter-shaft $f$ the perforated strainer-plate $h$, having a number of perforations, $h'\ h'$, as shown in Figs. 2 and 8, such strainer plate or dial being made to rotate with the central shaft, $f$, and its cutters, it being for this purpose provided with a central oblong hole, $h''$, adapted to fit the flattened sides of the shaft $f$. By having said perforated dial revolve it can be made in a common turning-lathe, as it is not necessary to have ears or projections on it, as is the case with stationary dials. It can also be made more cheaply, thereby enabling the purchaser to keep his machine in repair at much less cost than in the old way. Again, as it revolves with the shaft, there is but little friction compared to what there is when the dial is stationary and the lower knives are attached to the rotary shaft, for in such case it is necessary to crowd the dial so hard with a nut to keep the revolving knives crowded up to the dial so as to cut stringy meat, and that unless everything is very carefully adjusted it is very hard to turn the machine, thereby causing a great expenditure of power. The reason that there is less friction by my arrangement is that the meat and dial rotate together, which obviously lessens the friction.

Above and below the perforated rotary dial or strainer $h$ are located the stationary shearing-knives $i\,i$, the edges of which are adapted to lie in close proximity to the upper and under side of the dial $h$, for the purpose of clearing the latter from stringy particles of meat. Each of the shearing-knives $i$ is secured to a stationary block, $k$, located on one of the spindles $d$, on which the cutters $c\,c\,c$ are held, as shown in Figs. 2 and 3—that is, two blocks, $k\,k$, with two knives, $i\,i$, one set on top of the dial $h$, and one set on the bottom thereof for each spindle $d$, as shown.

The shearing-knives $i\,i$ are made adjustable to and from the dial $h$, to compensate for wear and sharpening by means of set-screws $i'$, passing through slot-hole $i''$ in each knife $i$, and screwed into the block $k$, as shown in Figs. 2 and 9. By the use of the slotted knives or blades $i\,i$, in combination with the revolving dial $h$, the blades $i\,i$ can be easily adjusted at all times so as to fit the dial, and thus more easily cut the stringy meat which may have escaped being cut up by the knives of the upper part of the machine.

The meat, after being cut by the knives aforesaid, is expelled through the opening $e^4$ in the cover $e$, and to facilitate the exit of the meat from the cylinder $a$, I secure to the shaft $f$, below the perforated dial $h$, the expeller-sleeve $l$, provided on its exterior with a helical or inclined expelling-wing, $l'$, as shown in Figs. 2 and 5. The interior of the sleeve $l'$, or a portion thereof, is screw-threaded, as shown in Fig. 2, and adapted to be screwed around the lower screw-threaded end, $f'''$, of the rotary shaft $f$, by which means and suitable intermediate blocks or washers, $m\,m$, the rotary knives $g\,g$, dial $h$, and expeller $l\,l'$ are all firmly secured to the central and rotary shaft, $f$, so as to partake of the rotary motion of the same. It will thus be seen that the expeller $l\,l'$ acts not only to expel the meat, but also as a nut to hold the knives and dial on the central shaft, and as the dial is fixed to the shaft the expeller can be screwed up tight, and thus obtain better results than when left loose, as is the case with a stationary dial.

$e^3$ is the lower bearing for the shaft $f$ in the center of the detachable cover $e$, and $n$ is a rest or step-piece secured to the cover $e$ by means of screw-bolt $n'$, to prevent the shaft $f$ and its cutters and dial from sagging downward.

Heretofore in machines of this kind the perforated dial or strainer at the end of the cylinder has been held stationary, and while in such position it is very liable to become clogged up by the stringy particles of meat that have passed by the cutters without being disintegrated; but such objection is entirely obviated by making the said perforated dial movable with its shaft, and adapted to move between the cutters $i$ above and below it, causing the stringy particles of meat to be cut up before passing by the strainer, and preventing the latter from being clogged up by the meat.

Each spindle $d$ is screw-threaded at or near the place for the lower block, $k$, and there provided with a nut, $d'$, that serves as a support for the blocks $k\,k$ and the series of cutters $c\,c$, as shown in Fig. 2. The lower end of each spindle $d$ is reduced at $d''$, which part is inserted in its radial slot $e'$ in the cover $e$, and provided with a nut, $d^3$, on its lower end, below the said cover $e$, as shown in Fig. 2, by which arrangement the said spindles $d\,d\,d$, with their knife-holding blocks and cutters, can easily be attached to the cover $e$ previous to their being introduced in position within the cylinder $a$.

What I wish to secure by Letters Patent, and claim, is—

1. In a meat-cutting machine, a perforated dial, $h$, attached to the shaft $f$, in combination with stationary blocks $k\,k$ and the adjustable slotted knives $i\,i$, as and for the purpose set forth.

2. In a meat-cutting machine, a perforated dial or strainer-plate, $h$, attached to the rotary cutter-shaft $f$, and adapted to revolve with it, the adjustable stationary cleaning-knives $i\,i$ and blocks $k\,k$, in combination with the screw-threaded sleeve $l$, with its helical wing $l'$, substantially as described.

3. In a meat-cutting machine, a series of cutters, $c\,c\,c$, each attached to a stationary block, $c'$, and secured in place on the respective spindles $d$, in combination with the cover $e$, having radial slots $e'\,e'\,e'$ for the reception of the spindles $d$.

In testimony whereof I have affixed my signature in presence of two witnesses.

WILLIAM G. BELL.

Witnesses:
 ALBAN ANDRÉN,
 JOHN H. FOSTER.